(12) United States Patent
Buehler (10) Patent No.: US 11,377,055 B2
(45) Date of Patent: Jul. 5, 2022

(54) CRASH ATTENUATOR WITH RELEASE PLATE HINGE ASSEMBLY, RELEASE PLATE HINGE ASSEMBLY AND METHOD FOR THE USE THEREOF

(71) Applicant: Trinity Highway Products LLC, Dallas, TX (US)

(72) Inventor: Michael J. Buehler, Roseville, CA (US)

(73) Assignee: Trinity Highway Products LLC, Addison, TX (US)

( * ) Notice: Subject to any disclaimer, the term of this patent is extended or adjusted under 35 U.S.C. 154(b) by 58 days.

(21) Appl. No.: 16/869,218

(22) Filed: May 7, 2020

(65) Prior Publication Data
US 2020/0361407 A1      Nov. 19, 2020

Related U.S. Application Data

(60) Provisional application No. 62/848,262, filed on May 15, 2019.

(51) Int. Cl.
*B60R 19/26* (2006.01)
*E01F 15/14* (2006.01)
*B60R 19/00* (2006.01)

(52) U.S. Cl.
CPC ............ *B60R 19/26* (2013.01); *E01F 15/148* (2013.01); *B60R 2019/005* (2013.01)

(58) Field of Classification Search
CPC ......... B60R 19/26; B60R 19/34; B60R 19/38; B60R 2019/005; E01F 15/148
USPC ............. 293/133, 132, 118, 102; 296/187.03
See application file for complete search history.

(56) References Cited

U.S. PATENT DOCUMENTS

| 2,984,512 A | 5/1961 | Shaginaw |
| 3,506,295 A | 4/1970 | Yancey |
| 3,674,115 A | 7/1972 | Young et al. |
| 3,757,562 A | 9/1973 | Goldberg et al. |

(Continued)

FOREIGN PATENT DOCUMENTS

| DE | 1239581 B | 4/1967 |
| GB | 2286160 A | 8/1995 |
| WO | WO 9405527 A1 | 3/1994 |

OTHER PUBLICATIONS

US 6,315,490 B1, 11/2001, Leonhardt et al. (withdrawn)

(Continued)

*Primary Examiner* — Jason S Morrow
*Assistant Examiner* — Wenwei Zhuo
(74) *Attorney, Agent, or Firm* — Crowell & Moring LLP (57) ABSTRACT

A crash attenuator includes a frame having a first frame member and a second frame member rigidly connected with a hinge assembly in a pre-impact configuration. The first and second frames are hingedly connected with the hinge assembly in an impact configuration. The hinge assembly includes a release plate fixedly connected to the first frame member, wherein the release plate comprises a fastener opening and a slot extending between the fastener opening and an edge of the release plate, and a fastener extending through the fastener opening and connecting the release plate to the second frame member when the first and second frames are in the pre-impact configuration. A hinge assembly, and method of using the crash attenuator, are also provided.

27 Claims, 9 Drawing Sheets

(56) References Cited

U.S. PATENT DOCUMENTS

| | | | |
|---|---|---|---|
| 3,930,665 A | 1/1976 | Ikawa | |
| 3,944,187 A | 3/1976 | Walker | |
| 3,972,390 A | 8/1976 | Melton et al. | |
| 4,008,915 A | 2/1977 | Walker | |
| 4,071,970 A | 2/1978 | Strizki | |
| 4,190,275 A | 2/1980 | Mileti | |
| 4,204,659 A | 5/1980 | Phillips et al. | |
| 4,221,413 A | 9/1980 | Bonnetain | |
| 4,227,593 A | 10/1980 | Bricmont et al. | |
| 4,352,484 A | 10/1982 | Gertz et al. | |
| 4,407,484 A | 10/1983 | Meinzer | |
| 4,413,856 A | 11/1983 | McMahan et al. | |
| 4,452,431 A | 6/1984 | Stephens et al. | |
| 4,552,341 A | 11/1985 | Zucker et al. | |
| 4,600,178 A | 7/1986 | Zucker et al. | |
| 4,635,981 A | 1/1987 | Friton | |
| 4,655,434 A | 4/1987 | Bronstad | |
| 4,658,941 A | 4/1987 | Gottwald et al. | |
| 4,674,911 A | 6/1987 | Gertz | |
| 4,711,481 A | 12/1987 | Krage et al. | |
| 4,770,420 A | 9/1988 | Gottwald et al. | |
| 5,052,732 A | 10/1991 | Oplet et al. | |
| 5,123,775 A | 6/1992 | Bryant | |
| 5,199,755 A | 4/1993 | Gertz | |
| 5,248,129 A | 9/1993 | Gertz | |
| 5,403,112 A | 4/1995 | Carney, III | |
| 5,403,113 A | 4/1995 | Gertz et al. | |
| 5,454,453 A * | 10/1995 | Meyer | B60K 17/00 180/377 |
| 5,551,796 A | 9/1996 | Anderson, Jr. et al. | |
| 5,577,861 A | 11/1996 | Oberth et al. | |
| 5,642,792 A | 7/1997 | June | |
| 5,697,657 A | 12/1997 | Unrath, Sr. | |
| 5,797,592 A | 8/1998 | Machado | |
| 5,823,584 A | 10/1998 | Carney, III | |
| 5,851,005 A | 12/1998 | Muller et al. | |
| 5,868,521 A | 2/1999 | Oberth et al. | |
| 5,947,452 A | 9/1999 | Albritton | |
| 6,024,341 A | 2/2000 | Gertz | |
| 6,092,959 A | 7/2000 | Leonardt et al. | |
| 6,098,767 A | 8/2000 | Unrath | |
| 6,116,805 A | 9/2000 | Gertz | |
| 6,183,042 B1 | 2/2001 | Unrath | |
| 6,186,565 B1 | 2/2001 | Unrath | |
| 6,203,079 B1 | 3/2001 | Breed | |
| 6,244,637 B1 | 6/2001 | Leonhardt et al. | |
| 6,264,258 B1 | 7/2001 | Li et al. | |
| 6,343,821 B2 | 2/2002 | Breed | |
| 6,394,513 B2 | 5/2002 | Rossmann | |
| 6,457,570 B2 | 10/2002 | Reid et al. | |
| 6,481,920 B1 | 11/2002 | Leonhardt et al. | |
| 6,523,872 B2 | 2/2003 | Breed | |
| 6,554,529 B2 | 4/2003 | Stephens et al. | |
| 6,579,034 B1 | 6/2003 | Welch et al. | |
| 6,581,992 B1 | 6/2003 | Gertz | |
| 6,619,491 B2 | 9/2003 | Payne et al. | |
| 6,668,989 B2 | 12/2003 | Reid et al. | |
| 6,866,284 B2 | 3/2005 | Carlsson | |
| 6,886,813 B2 | 5/2005 | Albritton | |
| 6,905,282 B2 | 6/2005 | Leonhardt et al. | |
| 6,926,324 B1 | 8/2005 | Gertz | |
| 6,942,263 B2 | 9/2005 | Welch et al. | |
| 7,112,004 B2 | 9/2006 | Alberson et al. | |
| 7,125,198 B2 | 10/2006 | Schiefferly et al. | |
| 7,216,904 B2 | 5/2007 | Thomas | |
| 7,243,964 B1 | 7/2007 | Gertz | |
| 7,341,397 B2 | 3/2008 | Murphy | |
| 7,380,829 B2 * | 6/2008 | Kishima | B62D 21/155 180/232 |
| 7,438,337 B1 | 10/2008 | Gertz | |
| 7,604,268 B2 | 10/2009 | Unrath, Sr. | |
| 7,690,687 B2 | 4/2010 | Reid et al. | |
| 7,735,614 B2 | 6/2010 | Carlsson | |
| 7,802,829 B2 * | 9/2010 | Maus | B60D 1/50 293/133 |
| 7,874,572 B2 | 1/2011 | Buehler et al. | |
| 7,874,792 B2 | 1/2011 | Tholen et al. | |
| 7,931,317 B2 | 4/2011 | Kern | |
| 7,931,318 B2 * | 4/2011 | Matsumura | B60R 19/24 293/133 |
| 8,074,761 B2 | 12/2011 | LaTurner et al. | |
| 8,136,830 B2 | 3/2012 | Buehler et al. | |
| 8,246,105 B2 * | 8/2012 | Mildner | B60K 11/04 296/187.09 |
| 8,276,956 B2 | 10/2012 | Maus | |
| 8,360,400 B2 | 1/2013 | Leonhardt et al. | |
| 8,388,012 B2 | 3/2013 | Buehler et al. | |
| 8,464,825 B2 | 6/2013 | LaTurner et al. | |
| 8,985,630 B2 * | 3/2015 | Sangha | B62D 21/12 280/784 |
| 9,067,551 B2 * | 6/2015 | Song | E05B 83/02 |
| 9,399,845 B2 * | 7/2016 | Buehler | B60R 19/38 |
| 9,616,931 B2 * | 4/2017 | Sangha | B62D 21/155 |
| 2003/0113160 A1 | 6/2003 | Welch et al. | |
| 2003/0215285 A1 | 11/2003 | Leonhardt et al. | |
| 2004/0251698 A1 | 12/2004 | Welch et al. | |
| 2005/0046207 A1 | 3/2005 | Rossmann | |
| 2007/0046041 A1 | 3/2007 | Thomas | |
| 2015/0069771 A1 | 3/2015 | Buehler et al. | |
| 2018/0170294 A1 * | 6/2018 | Hashimoto | B60R 19/34 |

OTHER PUBLICATIONS

Marquis, E.C., et al., "Texas Crash Cushion Trailer to Protect Highway Maintenance Vehicles" Research Report 146-6, Texas Transportation Institute, College Station Texas, 1972, 45 pages.

International Search Report and Written Opinion for PCT Application No. PCT/US2020/031031, dated Jul. 16, 2020, 10 pgs.

* cited by examiner

CRASH ATTENUATOR WITH RELEASE PLATE HINGE ASSEMBLY, RELEASE PLATE HINGE ASSEMBLY AND METHOD FOR THE USE THEREOF

This application claims the benefit of U.S. Provisional Application No. 62/848,262, filed May 15, 2019 and entitled "Crash Attenuator With Release Plate Hinge Assembly, Release Plate Hinge Assembly and Method for the Use Thereof," the entire disclosure of which is hereby incorporated herein by reference.

FIELD OF THE INVENTION

The present invention relates generally to a crash attenuator, and in particular, to a crash attenuator adapted for mounting to, or being towed by, a vehicle and which includes a release plate hinge assembly providing for collapse of the crash attenuator during an impact.

BACKGROUND

Truck Mounted (and towable) Attenuators (TMAs) have been used for many years on our nation's highways to protect road workers in works zones and other areas adjacent to high speed traffic. These crash attenuators, otherwise referred to as crash cushions, are typically mounted to the back of a work truck or other shadow vehicle, or towed thereby, and then placed some distance behind the work being done. In this way the crash cushion protects the road workers from errant vehicles that may have left the open travel lanes and would otherwise endanger the road workers. Likewise there may be road maintenance operations that require a slow moving shadow vehicle that is driven by one of the road workers. In this instance, the driver of the shadow vehicle is also protected by the Truck Mounted attenuator, should a vehicle impact it.

The road workers are not the only ones deriving benefits from a TMA. Drivers of errant vehicles also benefit, as the impact with the crash cushion may lessen the potential injuries from such an impact.

SUMMARY

The present invention is defined by the following claims, and nothing in this section should be considered to be a limitation on those claims.

In one aspect, one embodiment of a crash attenuator includes a frame having a first frame member and a second frame member moveable relative to each other between a pre-impact configuration and an impact configuration. The first and second frame members are rigidly connected with a hinge assembly in the pre-impact configuration and the first and second frames are hingedly connected with the hinge assembly in the impact configuration. The hinge assembly includes a release plate fixedly connected to the first frame member. The release plate has a fastener opening and a slot extending between the fastener opening and an edge of the release plate. A fastener extends through the fastener opening and connects the release plate to the second frame member when the first and second frames are in the pre-impact configuration. The fastener is releasable through the slot as the first and second frame members are moveable from the pre-impact configuration to the impact configuration.

In another aspect, a hinge assembly includes a hinge plate and a release plate spaced apart from the hinge plate. The release plate has a fastener opening and a slot extending between the fastener opening and an edge of the release plate. The fastener opening has a diameter and the slot has a width, wherein the width is less than the diameter.

A method of attenuating energy from an impacting vehicle with a crash attenuator includes providing a frame having a first frame member and a second frame member rigidly connected with a hinge assembly in a pre-impact configuration, impacting the crash attenuator, moving the first frame member relative to the second frame member about the hinge assembly to an impact configuration, moving the fastener through the slot, and thereby releasing the release plate from the second frame member.

The various embodiments of the crash attenuator, and methods of manufacture and use thereof, provide significant advantages over other crash attenuator systems. For example and without limitation, the frames can be easily and quickly assembled with a minimum of parts, with the hinge assemblies providing both the rigid connection of the frame members during normal operation, and also providing a hinge, allowing for collapse of the attenuator, during an impact event. The frames can be easily and quickly replaced. At the same time, the configuration of the fastener opening and slot provide a controlled and consistent release force during an impact event.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

Figure 1:
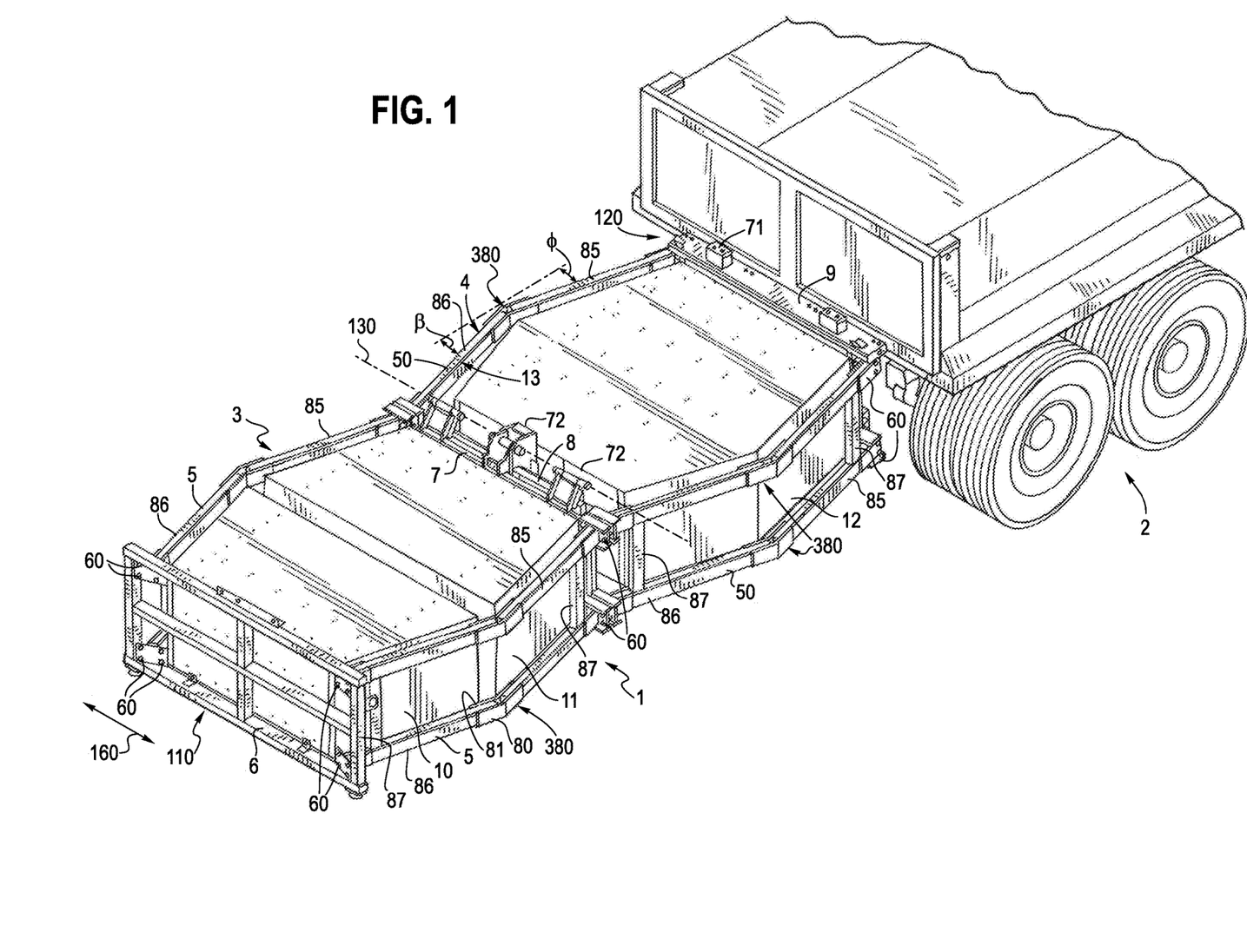
FIG. 1 is a rear perspective view of a crash attenuator attached to a vehicle in a deployed position.
Figures 2, 3:
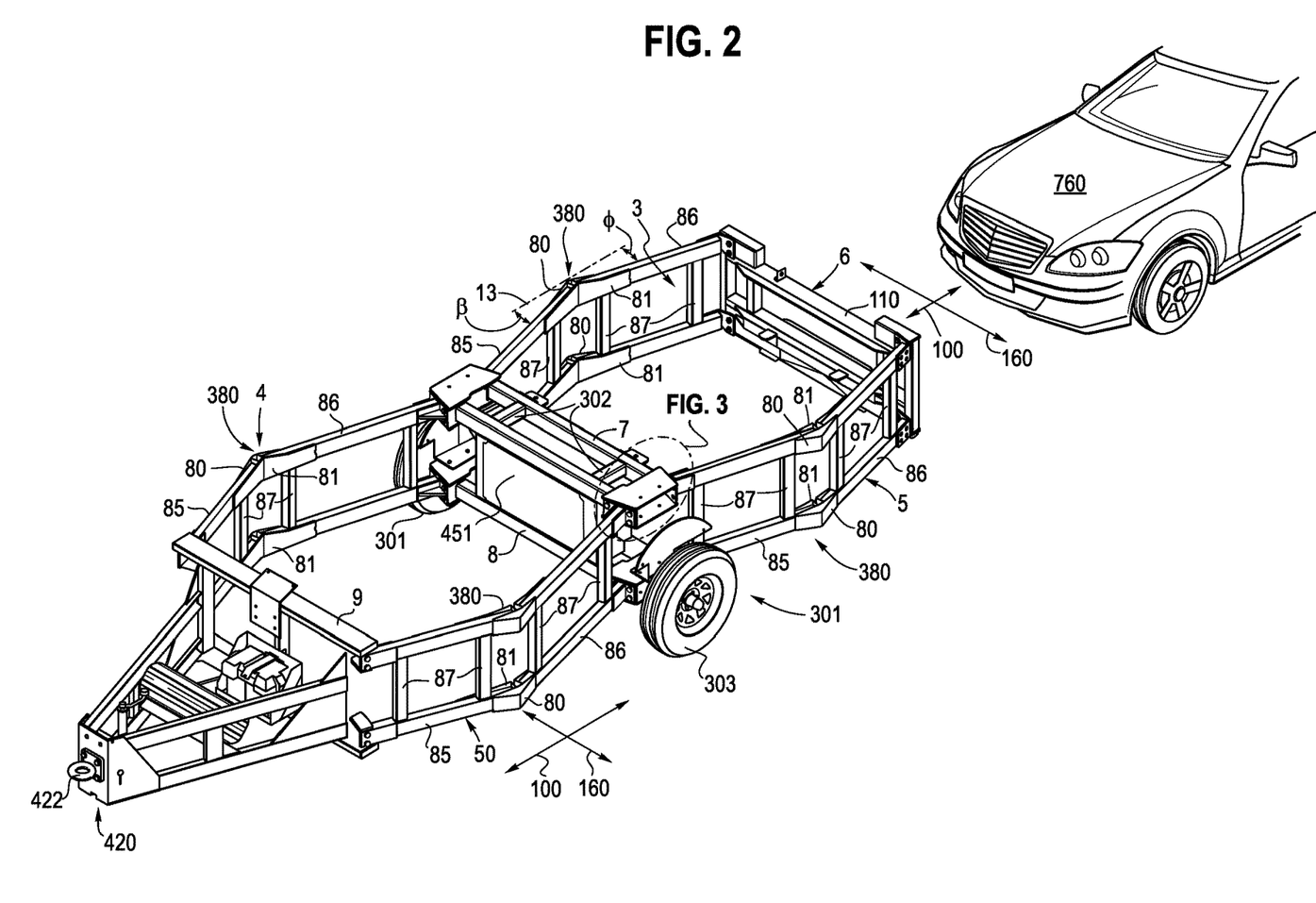
FIG. 2 is a front perspective view of an alternative embodiment of a crash attenuator.
FIG. 3 is an enlarged partial view showing a connection between different frame elements taken along line 3 of FIG. 2.
Figure 3:
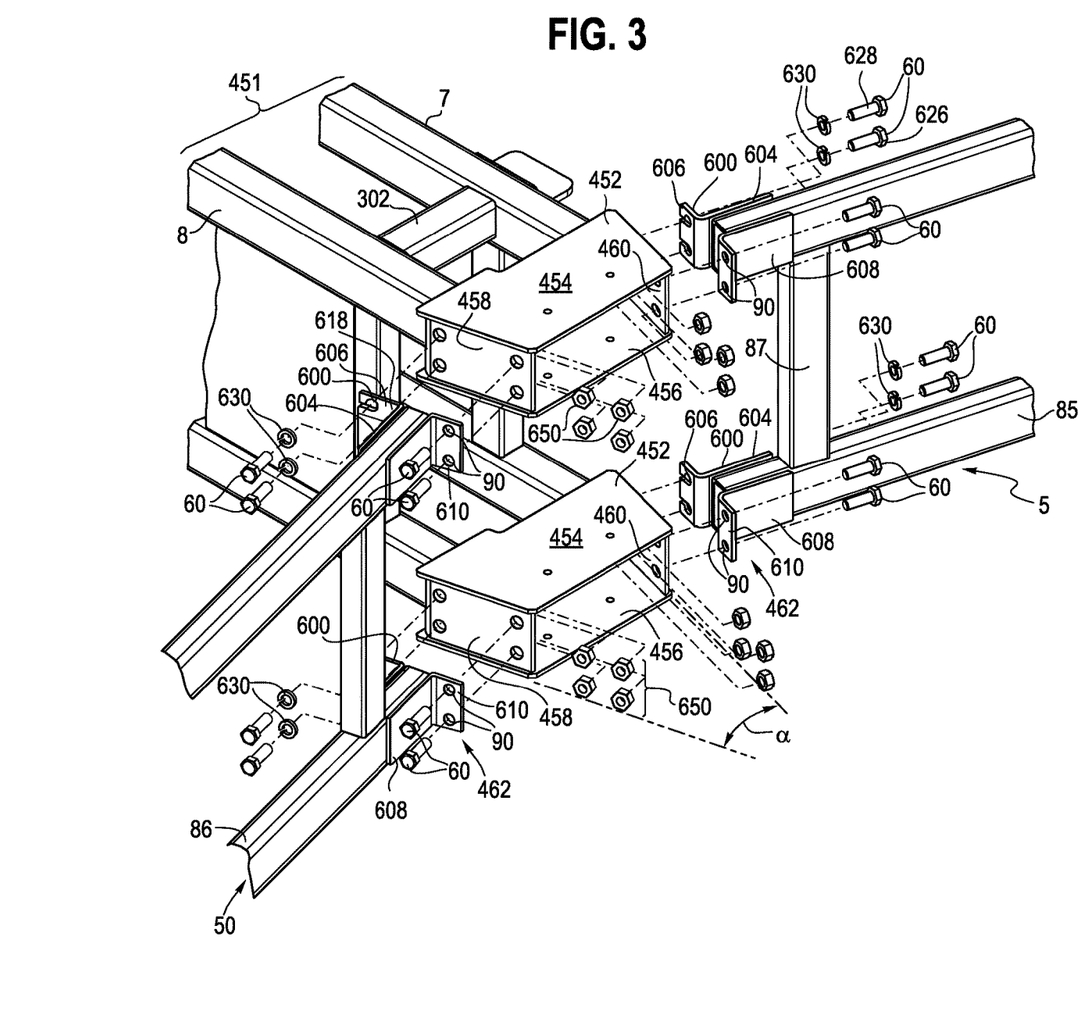

Referring to FIGS. 1 and 2, it should be understood that the term "longitudinal," as used herein means of or relating to length or the lengthwise direction 100 between an impact end 110 and an attachment end 120, 420 of a crash attenuator 1, 301, and is aligned with and defines an "axial impact direction" which is generally parallel to the direction of traffic flow. The term "lateral," as used herein, means directed between or toward (or perpendicular to) the sides of the crash attenuator in a sideways direction 160. The term "front," "forward," "forwardly," and variations thereof refer to the position or orientation relative to the attachment end 120, 420, which connects the crash attenuator 1, 301 to a shadow vehicle 2 or the like, while the term "rear, "rearward," "rearwardly," and variations thereof refer to the position or orientation relative to the impact end 110 of the crash attenuator 1, which receives an impacting vehicle 760. The term "downstream" refers to the position or orientation moving away from the impact end 110 and toward the attachment end 120, 420 of the crash attenuator 1, while the term "upstream" refers to the position or orientation moving toward the impact end 110 and away from the attachment end 120, 420 of the crash attenuator 1. Therefore, for example, a component positioned downstream of another component is closer to the attachment end 120, 420, and vice versa, a component positioned upstream of another component is closer to the impact end 110. The term "outboard" refers to the direction or orientation towards the outermost edges of the crash attenuator 1, 301, while the term "inboard" refers to the direction or orientation away from the outermost edges and towards the center of the crash attenuator 1, 301. The term "upper" refers to the vertical direction or orientation towards the top most edge of the crash attenuator 1, 301, while the term "lower" refers to the vertical direction or orientation towards the ground. The term "coupled" means connected to or engaged with, whether directly or indirectly, for example with an intervening member, and does not require the engagement to be fixed or permanent, although it may be fixed or permanent, and includes both mechanical and electrical connection. It should be understood that the use of numerical terms "first," "second" and "third" as used herein does not refer to any particular sequence or order of components; for example "first" and "second" frame members may refer to any sequence of such frame members, whether end, side, or mid frame members. The term "frangible," as used herein means to break into two or more pieces. The term "yield" means to bend or deform, without breaking.

FIG. 1 shows a crash attenuator 1 attached to a shadow vehicle 2, wherein the weight of the crash attenuator 1 is supported and carried by the shadow vehicle 2. As shown in FIG. 2, the crash attenuator 301 is supported by a pair of wheels 303 rotatable on an axle. The attachment end 420 includes a lunette eye 422, or pintle ring, that may be engaged by a pintle hook mounted on the shadow vehicle 2 (shown in FIG. 1). In both embodiments of FIGS. 1 and 2, the crash attenuator 1, 301 includes a frame defining a rear bay 3 and a front bay 4. The rear bay 3 includes an impact frame member 6 and a rear mid frame member 7 connected by side frame members 5, otherwise referred to as arm assemblies. Cartridges 10 and 11 are disposed inside of rear bay 3. Front bay 4 is composed of a front mid frame member 8 and a backup frame member 9 connected by side frame members 50, otherwise referred to as arm assemblies. Cartridge 12 is disposed inside of front bay 4. It should be understood that the cartridge 10, 11 and 12 are also disposed in the bays 3, 4 of the crash attenuator 301 shown in FIG. 2, but have been omitted in the drawings for the sake of clarity in showing the frame structure of that embodiment. It should also be understood that only a single cartridge, or more than two cartridges, may be disposed in the rear bay 3, and the front bay 4 may be configured with two or more cartridges.

Of course it should be understood that a wide range of changes could be made to embodiments described above. For instance, the crash attenuator may be formed into more than two bays and each bay could have one, many, or no cartridges disposed within it. Likewise, the crash attenuator may also be designed as described in U.S. Pat. No. 6,092, 959, where the attenuator does not hinge between bays, but instead hinges at the back of the support vehicles. Other embodiments would take the form of a trailer attenuator 301 as shown in FIG. 2, and/or as described in U.S. Pat. No. 7,874,572, or a single bay with an attached cartridge, as described in U.S. Pat. No. 5,642,792. The entire disclosures of U.S. Pat. Nos. 6,092,959, 7,874,792 and 5,642,792, are hereby incorporated herein by reference.

In preferred embodiments, frame members 5, 6, 7, 8, 9, and 50 are constructed from welded steel, including structural steel tubing, plate, angle, and other steel shapes as appropriate. Other embodiments may use other structural materials for these elements, such as aluminum, plastics, fiberglass, and etc. In preferred embodiments, cartridges 10, 11, and 12 are made from aluminum cells, for instance as was described U.S. Pat. Nos. 4,711,481 and 6,092,959. Other embodiments may use other appropriate crushable materials such as steel sheet, tin plated steel, plastic, or cardboard covered with an appropriate shell.

As shown in FIG. 1, the crash attenuator 1 includes hinge assemblies 72 which join rear mid frame member 7 to front mid frame member 8. Hinge assemblies 72 have a rotation axis 130. The rear bay 3 rests on bumpers 71 when it has rotated approximately 180 degrees around rotation axis 130. Fasteners 60 join side frame members 5 to impact frame member 6 and rear mid frame member 7. Fasteners 60 also join side frame members 50 to front mid frame member 8 and backup frame member 9.

FIG. 3 is a detail view of the connection of side frame members 5 and 50 to mid-frame members 7 and 8 shown in the embodiment of FIG. 2. The mid frame members 7, 8 of the crash attenuator 301 are coupled with cross members 302, for example by welding, so as to define a center frame member 451. The ends of the mid frame members 7, 8 are joined with upper and lower box end brackets 452, each having upper and lower walls 454, 456 joined with side walls 458, 460. The side walls 458, 460 are angled to form an angle α therebetween, which ensures that frame members 85, 86 defining the side frame members 5, 50 that are attached to the side walls are angled relative to each other, which promotes hinging of various hinge assemblies and subsequent collapse of the crash attenuator frame as further explained below. In one embodiment, the angle α defined between the side walls 458, 460 is 30 degrees, although it should be understood that other embodiments may use angles that are greater or lesser than 30 degrees.

Figure 4:
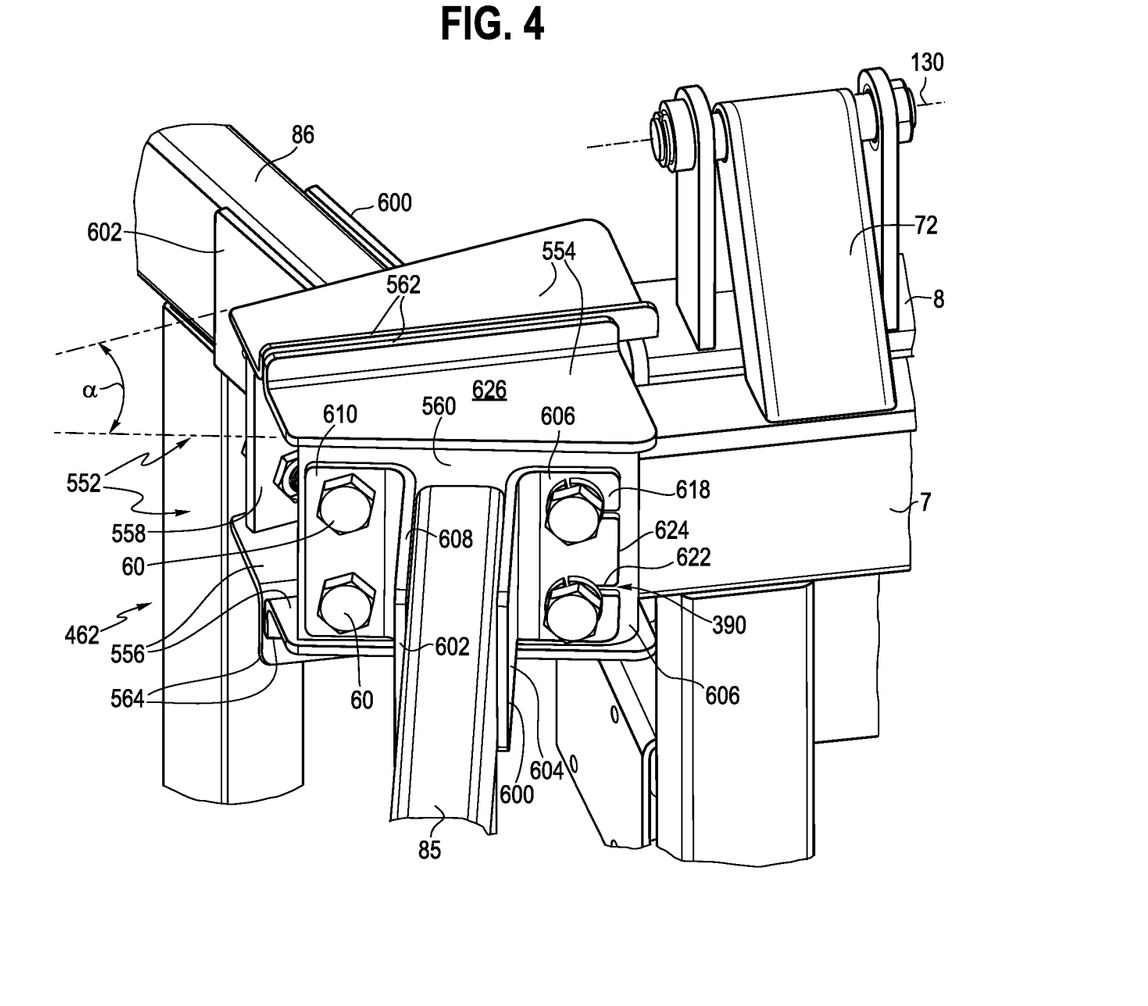
FIG. 4 is an enlarged partial view showing one embodiment of a hinge assembly.

In the embodiment of FIGS. 1 and 4, the mid frame members 7, 8 are connected with the hinge assemblies 72, with separate upper and lower end brackets 552 connected to the ends of the mid frame members 7, 8. The end brackets 552 have upper and lower walls 554, 556 joined with outer side walls 558, 560. The inner edges of the upper and lower walls are configured with upturned and downturned flanges 562, 564 that abut when the crash attenuator is in the deployed configuration. The side walls 558, 560 are angled to form an angle α therebetween, which ensures that frame members 85, 86 defining the side frame members 5, 50 are angled relative to each other, which promotes hinging of various hinge assemblies and subsequent collapse of the crash attenuator frame as further explained below. In one embodiment, angles α is 30 degrees, although it should be understood that other embodiments may use angles that are greater or lesser than 30 degrees.

Side frame members 5 and 50 include frame members 85, configured and otherwise referred to as forward tubes, joined with frame members 86, configured and otherwise referred to as rear tubes, with hinge assemblies 380, including outer hinge members 80 and inner hinge members 81, configured as bent steel plates overlapping the first and second frame members. It should be understood that the frame members 85, 86 may be the same, or different lengths, for example with forward frame members 85 being shorter or longer than rear frame members 86. In one embodiment, the outer hinge members 80 may be made from a thinner (or different) material than the inner hinge members 81, and are configured as plates in one embodiment. Although two hinge members 80 and 81 are shown in FIGS. 1 and 2, it should be understood that some designs may only contain one hinge member, for instance, by eliminating either outer hinge member 80 or inner hinge member 81. As show in the embodiment of FIG. 2, the inner plates 81 are longer than the outer plates 80, with each of the plates being wider at the junction between the first and second frame members 85, 86, e.g., at the virtual hinge axis.

Vertical members 87 join corresponding pairs of frame members 85 and frame members 86, giving the side frame members 5, 50 additional rigidity and constraining/spacing top tube members relative to bottom tube members. The various elements of the side frame members 5, 50 are held together by welding, however other methods of assembly including bolting, riveting, brazing, and etc. may be used. Although the vertical members 87 are beneficial in many designs, there are other designs that may make use of additional vertical members, or no vertical members at all, resulting in two separate pairs of arm members. There may also be designs that make use of angled members, as disclosed in U.S. Pat. No. 6,092,959. It should also be understood that other types of structural elements may be substituted for tubes 85, 86, and 87, such as angles, round sections, C-channels, T-sections, I-sections, E-sections and etc. It should also be understood that other shapes or materials may be used for hinge members 80 and 81.

Referring to FIGS. 2-5, the ends of the frame members 85, 86 are joined to the frame members 6, 9 and 451 with hinge assemblies 462, 464, each configured with an inner release plate 600, 700 laterally spaced apart from an outer hinge plate 602, 702, for example by a distance equal to the thickness of the frame member 85, 86. It should also be understood that in some embodiments, release plates and hinge plates could be integrally formed with the first and second frame members 85 and 86, for example by extending a side wall thereof.

Referring to FIGS. 3 and 4, which shows the hinge assemblies joining the mid frame members 7, 8 or central frame member 451, to the frame members 85, 86, each of the release plates and hinge plates are configured with first and second flanges 604, 608, 606, 610, with the first flanges 604, 608 fixedly connected to opposite sides of the frame members 85, 86, for example by welding, or with fasteners such as bolts. As mentioned, the first flanges may be integrally formed as a side wall of the frame members. The first flanges 604, 608 are parallel as shown in FIGS. 3 and 4. The second flanges 606, 610 are secured to the side walls 458, 460, 558, 560 of the end brackets 452, 552, which are secured to and define a portion of the mid frame members 7, 8 and or central frame member 451. The second flanges 606, 610 are substantially flush relative to each other, and are orthogonal to the first flange 604, 608. In other embodiments, the second flanges are oblique relative to the first flanges, meaning they are neither orthogonal nor parallel to the first flanges. Rather, the second flange of the hinge plate extends outwardly from the first flange (and away from the release plate) and forms an angle, for example, of 75 degrees relative thereto, while the second flange of the release plate extends inwardly from the first flange (and away from the hinge plate) and forms an angle, for example of 105 degrees relative thereto. It should be understood that other angles may also be suitable, and are defined by the relative angle of the frame members 85, 86 to the end bracket side walls 458, 460, 558, 560, which define in part the frame members 7, 8, 451. For example, in one embodiment, where the side walls are angled relative to each other, the first and second flanges are orthogonal in the pre-impact configuration.

Figure 5:
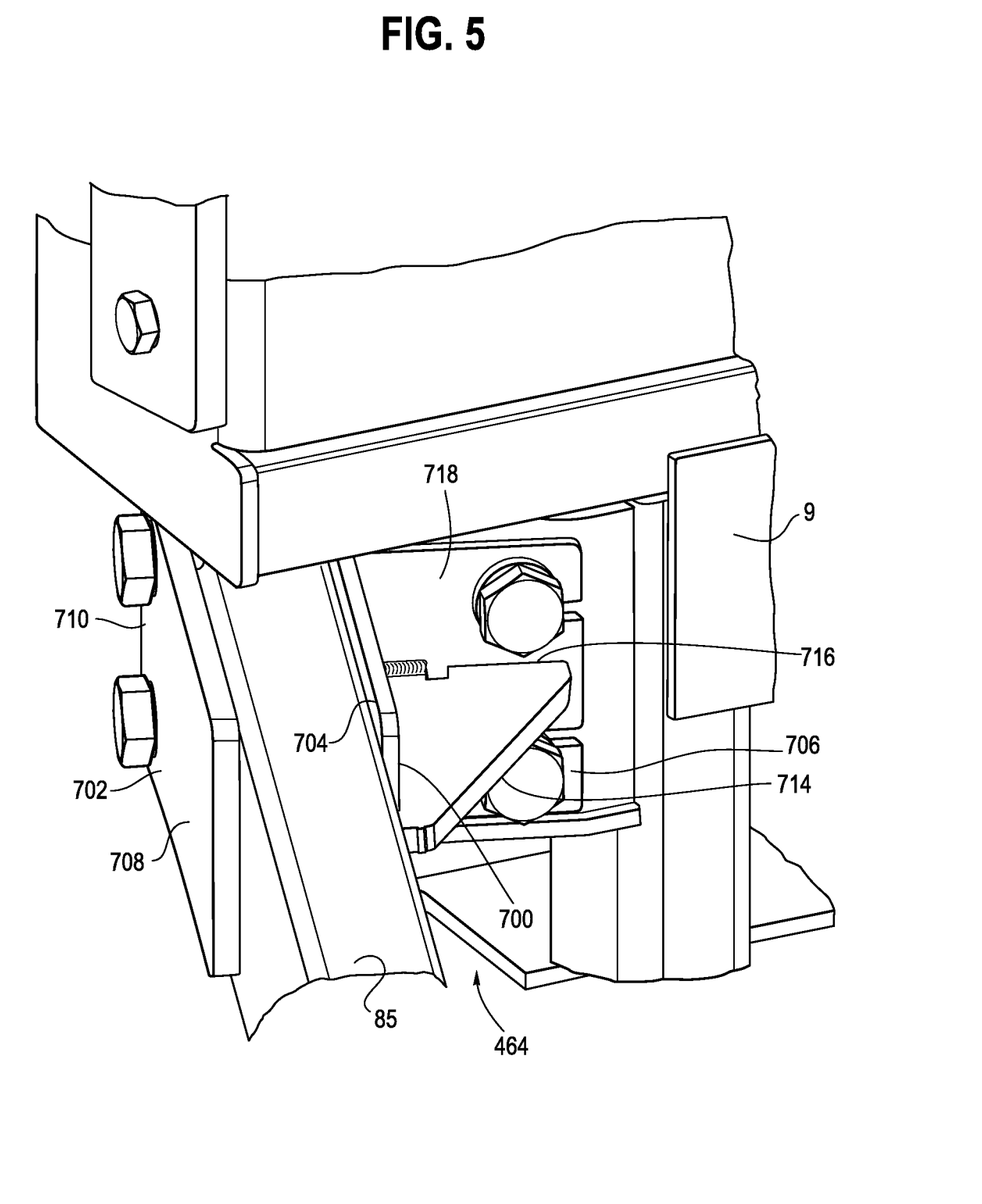
FIG. 5 is an enlarged partial view showing another embodiment of a hinge assembly.
Figure 8:
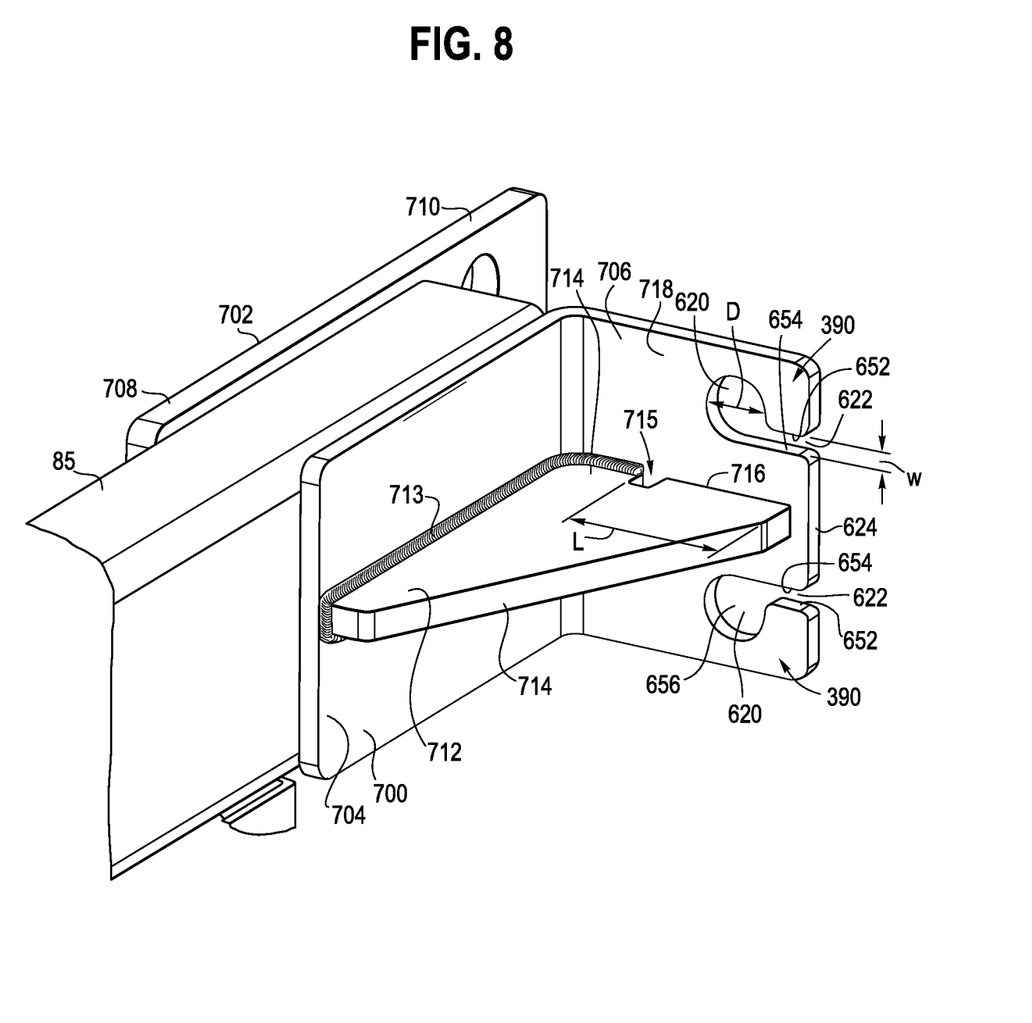
FIG. 8 is a perspective view of one embodiment of a hinge assembly connected to a first frame member.

Referring to FIGS. 5 and 8, which shows the hinge assembly 464 joining one side of the backup frame member 9 to the frame members 85, 86, the release plate 700 is again configured with first and second flanges 704, 706, with the first flange 704 fixedly connected to an inner sides of the frame members 85, 86, for example by welding, or with fasteners such as bolts. As mentioned, the first flange may be integrally formed as a side wall of the frame members. It should be understood that a hinge assembly 464, with a release plate 700, may also join the end impact frame member 6 to the frame members 85, 86, or the release plate 700 may be omitted, with only living hinges joining the end impact frame 6 to the frame members 85, 86. The hinge plate 702 is configured as a flat plate, but may be thought of as having first and second flanges 708, 710 that are parallel and flush, with the first flange 708 being the portion overlying the frame member 85, 86, and the second flange 710 being the portion overlying the ends of the frame members 9. Or, the hinge plate 702 may be bent, with first and second flanges. The first flanges 704, 708 of the hinge and release plates are parallel as shown in FIG. 5. The second flanges 706, 710 of the hinge plate and release plate are secured to the frame members 9. The second flanges are substantially orthogonal relative to each other, but with the second flange 706 of the release plate extending inwardly from the first flange (and away from the hinge plate) and forming an angle of 90 degrees relative thereto, so as to mate with end portions of the frame member 9. In other embodiments, the flanges of the release plate may form an angle of 75 degrees relative to each other. It should be understood that other angles may also be suitable, and are defined by the relative angle of the frame members 85, 86 to the end frame members 9. The release plate 700 further includes a gusset plate 712, or stiffening rib, fixedly coupled to the first flange, for example by welding 713, and extending inwardly therefrom, preferably with an orthogonal relationship. The gusset flange has a triangular shape, with an angled side edge 714 and an end free edge 716, which is disposed along a slip surface 718 of the second flange 706.

As shown in FIGS. 5 and 8, the welding 713 extends along the length of the interface between the gusset plate 712 and the face of the first flange 704, and along a portion of the interface between the gusset plate 712 and the second flange 706 between the junction of (corner between) the first and second flanges and an indicator notch 715. In this way, the assembler knows to run the weld line up to the notch 715 and provides certainty as to the amount of weld provided between the gusset plate 712 and second flange 706. This leaves a length (L) defining the free edge 716 of the gusset plate 712 abutting the second flange 706, which is not welded or otherwise fixed, and which is measured between the notch and the end of the gusset plate 712. In operation, the unfixed portion, or free edge 716, of the gusset may abut and bear against the second flange 706 in compression so as to prevent and limit any inward bending of the frame member 85 relative to the end frame 9. The gusset assists in making the connection more robust over the life of the system, for example resisting relative movement during vehicle turning and/or when the system is folded during transport. Conversely, the portion of the weld between the gusset plate 712 and second flange 706 may tear during an impact event so as to allow the first and second flanges 704, 706 to bend relative to each other. It should be understood that gussets may also be provided at the connections between the flanges 604, 606, including welding portions thereof as described herein.

The second flange 610, 710 of each hinge plate 602, 702 is fixedly (non-releasably) secured to the end bracket/mid frame members or end frame members 6, 9 with fasteners extending through mounting holes 90 to allow fasteners 60 to attach the side frames 5, 50 to the mid frames. In one embodiment, the fasteners 60 are configured as bolts secured with nuts. Other embodiments may use other assembly methods, such as riveting welding, brazing, and etc. instead of bolts.

Referring to FIGS. 1-5, the second flange 606, 706 of the release plates 600, 700 are releasably secured to the end brackets 452, 552, which define in part the mid frame members 7, 8, center frame member 451, or end frames 9 with fasteners 60 extending through mounting holes 390 (shown in FIG. 8) to allow fasteners 60 to attach the side frames 5, 50 to the mid frame members or end frame members. The mounting holes 390 include a fastener opening 620 and a slot 622 extending between the fastener opening and an inner side edge 624 of the release plate. The fasteners 60 are configured as bolts having a head 626 and a shank 628, with the shank being inserted through the fastener opening and engaged with a nut 650. A backing washer 630 is disposed between the head 626 and a "slipping" surface 618, 718 of the second flange 606, 706. Preferably, the washer 630 is round, or circular, such that it offsets the points of the head 626, which may have a hex shape, from the surface of the release plate. In this way, the washer 630 ensures that the orientation of the head will not require indexing for the slipping function to remain constant. The washer 630 may be configured as a split lock washer.

Figure 6A:
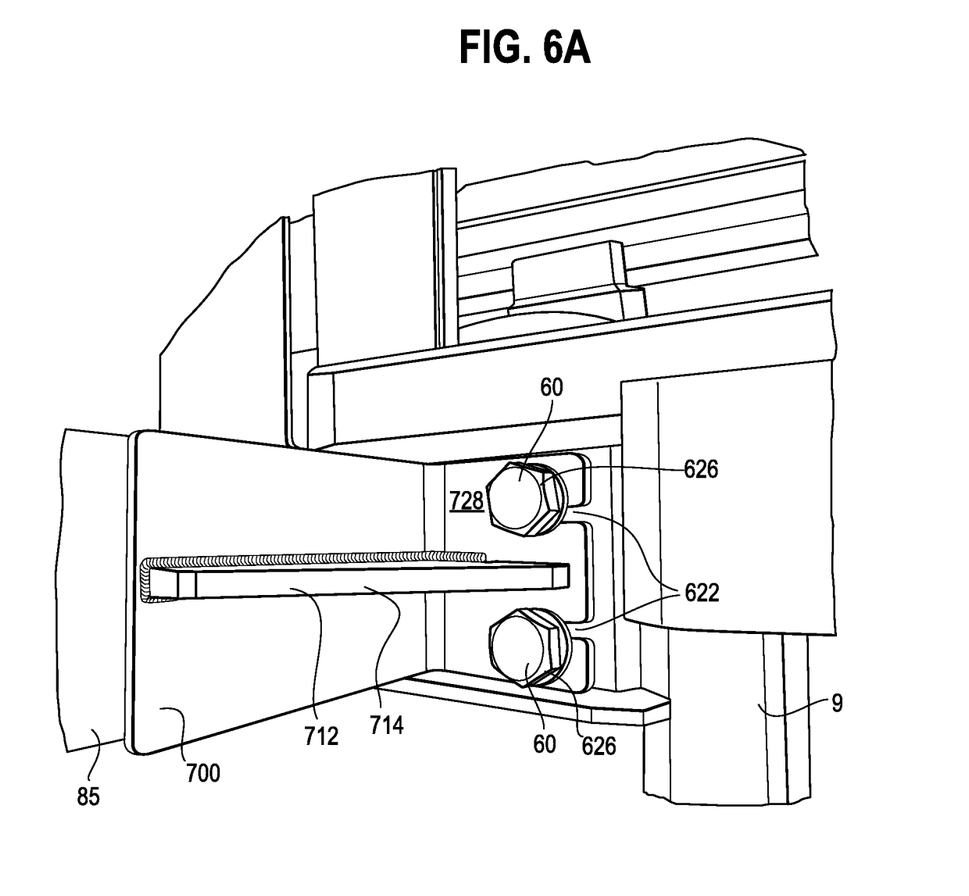
FIGS. 6A and B are enlarged partial views showing a release plate in a pre-impact and impact configurations respectively.
Figure 6B:
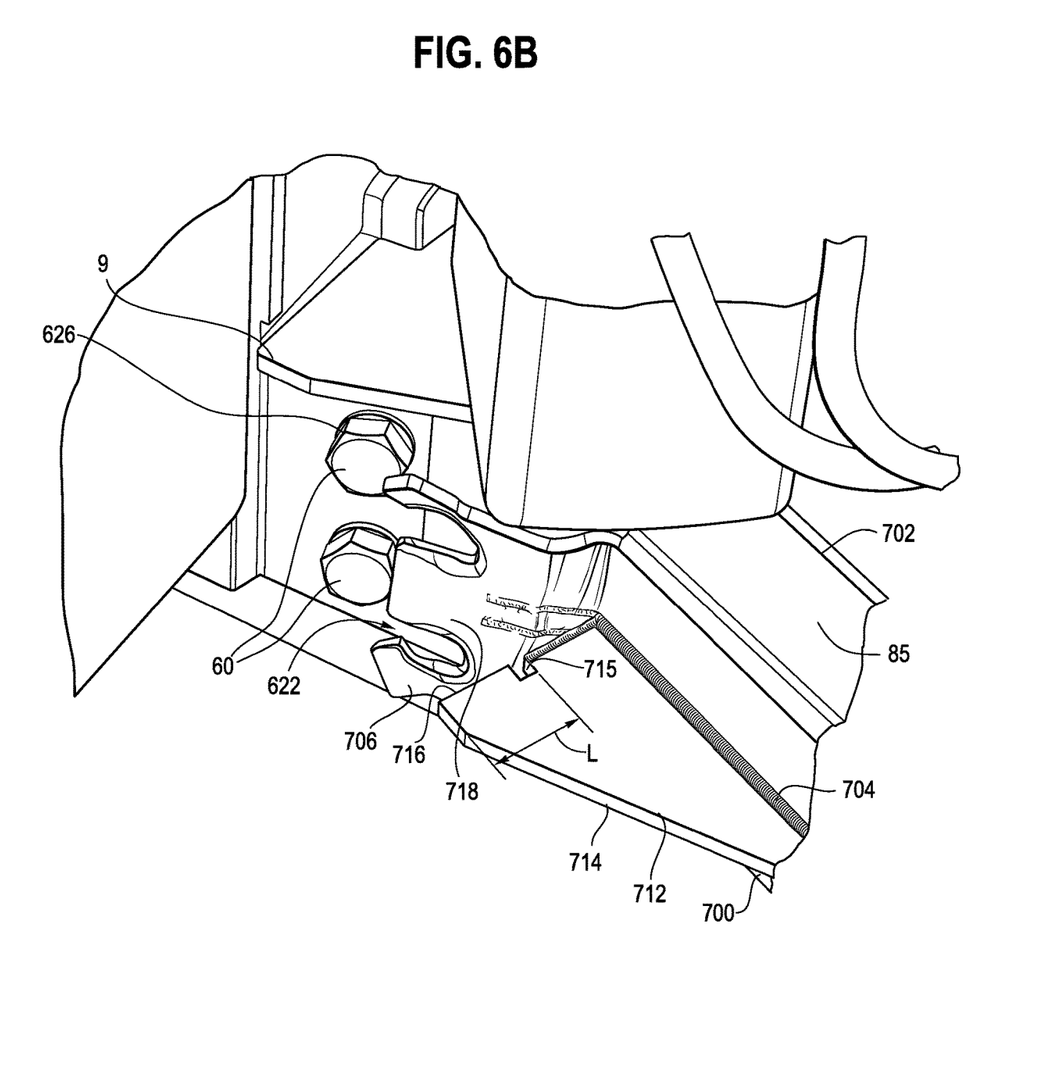

The shank 628 has an outer diameter allowing for it to pass through the fastener opening 620, having an inner diameter D. The slot 622 has a width W defined between the opposite side edges 652, 654 thereof, with the width W being less than the inner diameter D and outer diameter of the shank in one embodiment. In other embodiments, the width W and inner diameter D may be the same. In one embodiment, W is a ¼ inch while D is 13/16 or 7/8 inches. The fastener opening 620 has a central axis 656. The slot 622 communicates with the fastener opening 620 offset from the central axis 656. In one embodiment, one side edge 654 of the slot defines a tangent to the outer edge of the fastener opening 620. In this embodiment, the fastener opening 620 and slot 622, in combination, are P shaped, or define a P-shaped release opening. As shown in FIGS. 4-6, each release plate 600, 700 has a pair of fastener openings 620 and slots 622, although it should be understood that a single fastener opening and slot, or more than two fasteners openings and slots, may be suitable. As show in FIG. 8, the upper mounting hole 390 has the slot 622 oriented along a bottom of the opening 620, while the lower mounting hole 390 has the slot 622 oriented along a top of the opening 620, with the distance between the slots 622 thereby being minimized. By having the slots offset from the opening centerline and oriented on opposite sides thereof, the fasteners will not tend to both work their way out of the slots, for example if they became inadvertently loosened. It should be understood that the orientation may be switched, with the distance between the slots 622 being maximized, or the slots may be arranged along some other portion of the openings, for example along a midpoint thereof.

The fasteners may be torqued, and have a predetermined coefficient of friction, or range thereof, between the washer and release plate to assist in providing a controlled and consistent release force during an impact event. For example and without limitation, in one embodiment, the coefficient of friction (e.g., $\mu$=0.4 to 0.7) is between powder-coated steel (coated, or painted steel), which provides a desired static coefficient of friction. In combination with the coefficient of friction, the controlled clamping pressure between the components, in the form of torque applied to the holding fasteners 60, provides a stable system during the life of the product by holding the arms in their pre-impact state. The torque and coefficient of friction, also help to ensure the release of the arms during impact. In one embodiment, the fasteners 60 securing the hinge plates are torqued to 120-130 ft lbs, while the fasteners 60 securing the release plates are torqued to 55-60 ft lbs. It should be understood that the number and dimensions of the fasteners 60, the relative dimension of the slots 622 and fasteners 60, the type and thickness of the material of the release plates, the torque applied to the fasteners, and many other variables may play a role, and may be varied, to allow the system to collapse at various predetermined impact forces and angles.

Although rear frame members 85 and front frame members 86 are shown as being similar in length in the embodiments of FIGS. 1 and 2, it should be understood that these frame members could be different in length depending upon the needs of a specific design. For instance, in some designs of side frame member 5, front frame members 85, or tubes, may be longer or shorter than rear frame members 86, or tubes. Other designs may vary the length of the frame members of the front frame member 50 and still other designs may vary the length of both sets of frame members.

As shown in FIGS. 1 and 2, rear frame members 85 are angled from a longitudinal direction 100 by the angle $\beta$. Likewise, front frame members 86 are angled from a longitudinal direction 100 by the angle $\phi$. In this way, the front and rear frame members form an obtuse angle therebetween. Angling the frame members, or arms, as shown in FIGS. 1 and 2 promotes hinging of the hinge assemblies and subsequent collapse of the crash attenuator frame. Angling the frame members also promotes hinging of the inner hinge plate 81 and failure of outer hinge member 80. In the embodiments of FIGS. 1 and 2, angle $\beta$ is 15 degrees, although it should be understood that other embodiments may use angles that are greater or lesser than 15 degrees. It should also be understood that some embodiments may use angles that are unequal, for instance, angle $\beta$ could be greater than angle $\phi$, or vice versa.

Although the release plates 600, 700 include release slots 622, other methods could be used to provide weakened regions to promote the release of the fasteners 60, as is needed in certain designs. For instance, the material and/or thickness of the release plate may be different than the material and/or thickness of the hinge plate 602, 702. FIGS. 6A and B and 7A-F are sequential views of one embodiment of hinge assemblies 380 moving between a pre-impact configuration and an impact configuration during a vehicle impact.

Referring to FIGS. 1-3, the impact causes relative rotation of arms 85 and 86, which creates tensile forces in outer hinge member 80 and compressive forces in inner hinge member 81. Because outer hinge member 80 is made of thinner material, the tensile forces cause higher stresses in outer hinge member 80 than are present in inner hinge member 81. This causes outer hinge member 80 to fail and break into two pieces. Meanwhile, inner hinge member 81 has formed a living hinge, allowing the rotation of rear tube 85 in relation to front tube 86. The phrase "living hinge" refers to an integral piece of material having an intermediate region that flexes, including for example and without limitation, a thin flexible plate having opposite end portions and an intermediate portion. The hinge member may be thinned or cut to allow the rigid pieces to bend along the line of the hinge.

Figure 7A:
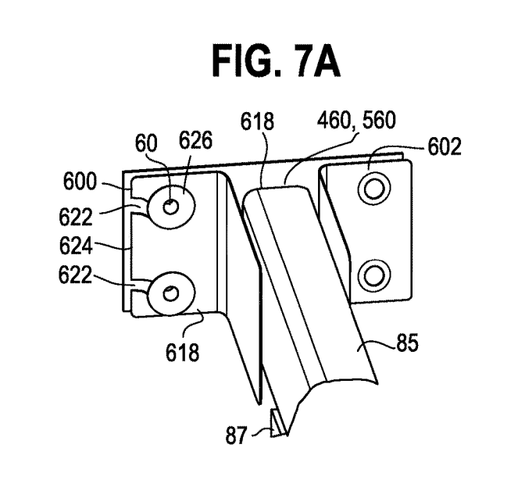
FIGS. 7A-F show the movement of one embodiment of a hinge assembly from the pre-impact to the impact configuration.
Figure 7B:
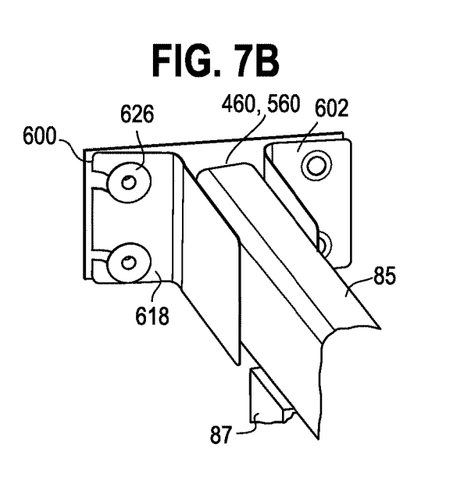
Figure 7C:
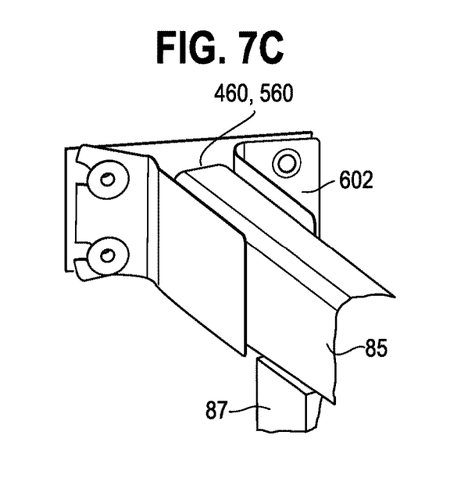
Figure 7D:
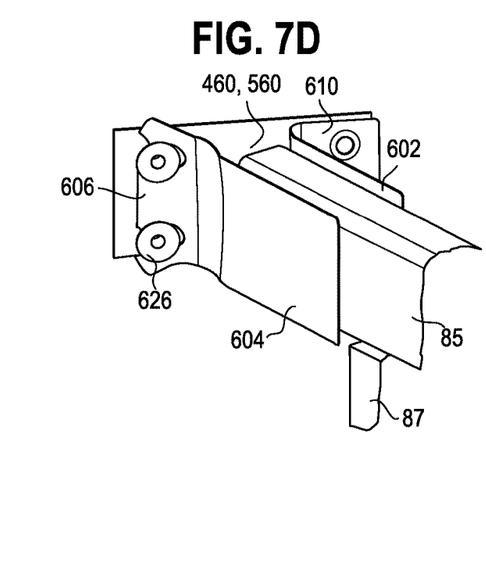
Figure 7E:
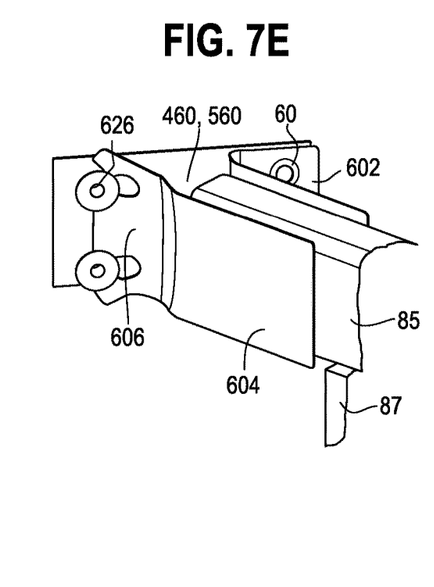
Figure 7F:
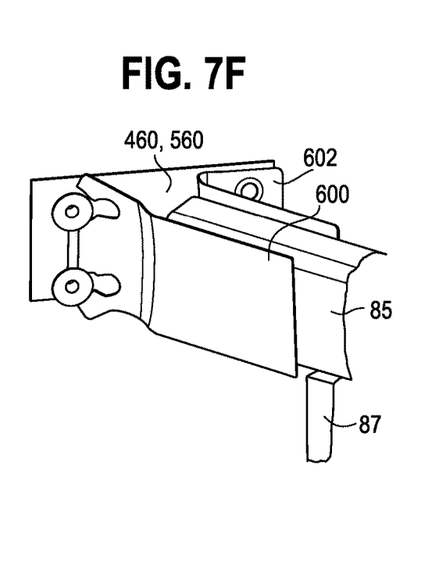

FIGS. 6A and 7A shows hinge assemblies 380 in an initial, pre-impact condition or configuration. In FIG. 7B, mid frame members 7, 8, or central frame member 451, move, or begin to rotate relative to the frame members 85, 86 due to an impact by a vehicle into crash attenuator 1, 301, as shown in FIG. 2. The impact causes rotation of the front and rear frame members 85, 86 relative to the frame members 7, 8, 9, 451. The rotation of frame members 85, 86, as shown in FIGS. 7B-F, causes the release plates 600 to bend/deform, and open up, with the first flange 604 moving relative to the second flange 606. The tensile force applied to the release plate 600 causes the washer 626 to slide along the slip surface 618 of the release plate and the fastener shank 628 to pull through the slot 622 and eventually release the release plate 600 from the frame member 7, 8, 451 (see FIGS. 7D-F), thereby allowing the hinge plate 602 to bend/deform and function as a living hinge. FIG. 7F shows the frame members at the end of the crash event, where the hinge plates 602, defining living hinges, in the hinge assemblies permit continued rotation of rear and front frame members 85, 86.

During the same impact event, the rotation of frame members 85, 86, as shown in FIG. 6B, causes the release plates 700 to bend/deform, and open up, with the first flange 704 moving relative to the second flange 706. The tensile force applied to the release plate 700 causes the washer 626 to slide along the slip surface 718 of the release plate and the fastener shank 628 to pull through the slot 622 and eventually release the release plate 700 from the frame 9 (see FIG. 6B), thereby allowing the hinge plate 702 to bend/deform and function as a living hinge. At the same time, the portion of the weld 713 between the gusset plate 712 and second flange 706 may tear, again allowing the hinge plate 702 to bend and deform. FIG. 6B shows the frame members at the end of the crash event, where the hinge plates 702, defining living hinges, in the hinge assemblies permit continued rotation of rear and front frames 85, 86 relative to the end frames 9. As the hinge plates 702 bend along a preferred vertical axis, the release plates 700 slide and bend, thereby releasing from the grip of the bolts and backing washers. The release of the release plates is allowed due to the slot 622 in the release plate widening just enough for the release plate to bend away from and release the fastener 60.

In the pre-impact configuration, which may constitute the entire life of the TMA, the side frames 5, 50 are held in static location without relative motion between the components of the TMA. The release plates 600, 700 function as part of the holding strength within the arms of the TMA. The release plates 600, 700 maintain their original shape, and the static angle throughout the frame and structure of the TMA.

As a highway safety device, the TMA functions as an energy absorbing crash attenuator. When this occurs, the TMA absorbs the energy of an impacting vehicle during an impact event. As the impacting vehicle 760 is brought to rest, the energy is absorbed through the compression of energy absorbing cartridges, the motion of the frame, and the bending of the frame arms 5, 50 as they collapse towards the support/host vehicle 2.

During arm folding, the hinge plates 602, 702 will bend as a hinge between the arm tube and the mating rigid assembly (mid-frame/central member or end frame member). As the arms 5, 50 bend, the arms swing outward and do so by bending the hinge plates 602, 702 as shown in FIGS. 6A-B and 7A-F. As the hinge plates 602, 702 bend along a preferred vertical axis, the release plates 600, 700 slide and bend, releasing from the grip of the bolts and backing washers. The release is allowed due to the slot in the release plate widening just enough for the release plate to bend away from the bolt. Once the release plate has been fully released from the bolts and backing washers, the arms 5, 50 are free to rotate through the bending axis of the hinge plates 602, 702.

The hinge plates 602, 702 and release plates 600, 700 operate at frame corners of the side frames 5, 50 located at the end frame members and mid frame members. The hinge plates and release plates may operate together, in pairs, or separately to cause bending of the arms as needed to stop an impacting vehicle.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A crash attenuator comprising:
   a frame comprising a first frame member having opposite first and second sides and a second frame member moveable relative to the first frame member between a pre-impact configuration and an impact configuration, wherein the first and second frame members are rigidly connected with a hinge assembly in the pre-impact configuration and wherein the first and second frames are hingedly connected with the hinge assembly in the impact configuration, wherein the hinge assembly comprises:
      a release plate fixedly connected to a first side of the first frame member, wherein the release plate comprises a fastener opening and a slot extending between the fastener opening and an edge of the release plate;
      a hinge plate spaced apart from the release plate, wherein the hinge plate is fixedly connected to a second side of the first frame member and is fixedly connected to the second frame member; and
      a fastener extending through the fastener opening and connecting the release plate to the second frame member at a location spaced apart from and free of any engagement with the hinge plate when the first and second frames are in the pre-impact configuration, wherein the fastener is releasable through the slot as the first and second frame members are moveable from the pre-impact configuration to the impact configuration.

2. The crash attenuator of claim 1 wherein the hinge plate comprises a first flange connected to the first frame member and a second flange connected to the second frame member, and wherein the release plate comprises a first flange connected to the first frame member and a second flange connected to the second frame member, wherein the first and second flanges of the hinge plate are non-parallel and the first and second flanges of the release plate are non-parallel.

3. The crash attenuator of claim 2 wherein the first flange of the hinge plate is parallel to the first flange of the release plate.

4. The crash attenuator of claim 3 wherein the second flange of the hinge plate extends away from the release plate and the second flange of the release plate extends away from the hinge plate.

5. The crash attenuator of claim 1 wherein the fastener comprises a bolt having a head, and further comprising a washer disposed between the head of the bolt and a surface of the release plate.

6. The crash attenuator of claim 1 wherein the fastener opening has a diameter and the slot has a width, wherein the width is less than the diameter.

7. The crash attenuator of claim 6 wherein the fastener opening has a central axis, and wherein the slot communicates with the fastener opening offset from the central axis.

8. The crash attenuator of claim 7 wherein the slot has a side edge defining a tangent to an outer edge of the fastener opening.

9. The crash attenuator of claim 8 wherein the fastener opening and slot, in combination, are P shaped.

10. The crash attenuator of claim 1 wherein the fastener opening comprises a first fastener opening, the slot comprises a first slot and the fastener comprises a first fastener, and wherein the release plate comprises a second fastener opening spaced apart from the first fastener opening and a second slot extending between the second fastener opening and the edge of the release plate; and wherein the second fastener extends through the second fastener opening and connects the release plate to the second frame member when the first and second frames are in the pre-impact configuration, and wherein the second fastener is releasable through the second slot as the first and second frame members are moveable from the pre-impact configuration to the impact configuration.

11. The crash attenuator of claim 1 wherein the release plate comprises a first flange fixedly connected to the first frame member and a second flange extending from the first flange in a non-parallel relationship.

12. The crash attenuator of claim 11 wherein the first and second flanges are oblique.

13. The crash attenuator of claim 11 wherein the release plate further comprises a gusset flange connected to the first flange.

14. A crash attenuator comprising:
a frame comprising a first frame member and a second frame member moveable relative to each other between a pre-impact configuration and an impact configuration, wherein the first and second frame members are rigidly connected with a hinge assembly in the pre-impact configuration and wherein the first and second frames are hingedly connected with the hinge assembly in the impact configuration, wherein the hinge assembly comprises:
a release plate fixedly connected to the first frame member, wherein the release plate comprises a first flange fixedly connected to the first frame member, a second flange extending from the first flange in a non-parallel relationship, and a gusset flange connected to the first flange, wherein the gusset flange comprises a free edge disposed along a surface of the second flange, and wherein the second flange comprises a fastener opening and a slot extending between the fastener opening and an edge of the release plate; and
a fastener extending through the fastener opening and connecting the second flange of the release plate to the second frame member when the first and second frames are in the pre-impact configuration, wherein the fastener is releasable through the slot as the first and second frame members are moveable from the pre-impact configuration to the impact configuration.

15. The crash attenuator of claim 1 wherein the hinge plate is bendable as the first and second frame members are moveable from the pre-impact configuration to the impact configuration.

16. A crash attenuator comprising:
a frame comprising a first frame member and a second frame member moveable relative to each other between a pre-impact configuration and an impact configuration, wherein the first and second frame members are rigidly connected with a hinge assembly in the pre-impact configuration and wherein the first and second frames are hingedly connected with the hinge assembly in the impact configuration, wherein the hinge assembly comprises:
a hinge plate fixedly connected to the first and second frame members;
a release plate fixedly connected to the first frame member, wherein the release plate comprises a first fastener opening and a first slot extending between the first fastener opening and an edge of the release plate, and a second fastener opening spaced apart from the first fastener opening and a second slot extending between the second fastener opening and the edge of the release plate; and
a first fastener extending through the first fastener opening and a second fastener extending through the second fastener opening, wherein the first and second fasteners connect the release plate to the second frame member free of any engagement with the hinge plate when the first and second frames are in the pre-impact configuration, and wherein the first and second fasteners are releasable through the first and second slots respectively as the first and second frame members are moveable from the pre-impact configuration to the impact configuration.

17. The crash attenuator of claim 16 wherein the hinge plate is bendable as the first and second frame members are moveable from the pre-impact configuration to the impact configuration.

18. The crash attenuator of claim 16 wherein the hinge plate comprises a first flange connected to the first frame member and a second flange connected to the second frame member, and wherein the release plate comprises a first flange connected to the first frame member and a second flange connected to the second frame member, wherein the first and second flanges of the hinge plate are non-parallel and the first and second flanges of the release plate are non-parallel.

19. The crash attenuator of claim 18 wherein the first flange of the hinge plate is parallel to the first flange of the release plate.

20. The crash attenuator of claim 19 wherein the second flange of the hinge plate extends away from the release plate and the second flange of the release plate extends away from the hinge plate.

21. The crash attenuator of claim 18 wherein the release plate further comprises a gusset flange connected to the first flange.

22. The crash attenuator of claim 21 wherein the gusset flange comprises a free edge disposed along a surface of the second flange.

23. The crash attenuator of claim 16 wherein the first fastener comprises a bolt having a head, and further comprising a washer disposed between the head of the bolt and a surface of the release plate.

24. The crash attenuator of claim 16 wherein the first fastener opening has a diameter and the first slot has a width, wherein the width is less than the diameter.

25. The crash attenuator of claim 24 wherein the fastener opening has a central axis, and wherein the slot communicates with the fastener opening offset from the central axis.

26. The crash attenuator of claim 25 wherein the first slot has a side edge defining a tangent to an outer edge of the first fastener opening.

27. The crash attenuator of claim 26 wherein the first fastener opening and the first slot, in combination, are P shaped.

* * * * *